Nov. 22, 1966     J. CHOLET ET AL     3,287,696
VIBRATOR
Filed Oct. 28, 1963     3 Sheets-Sheet 1
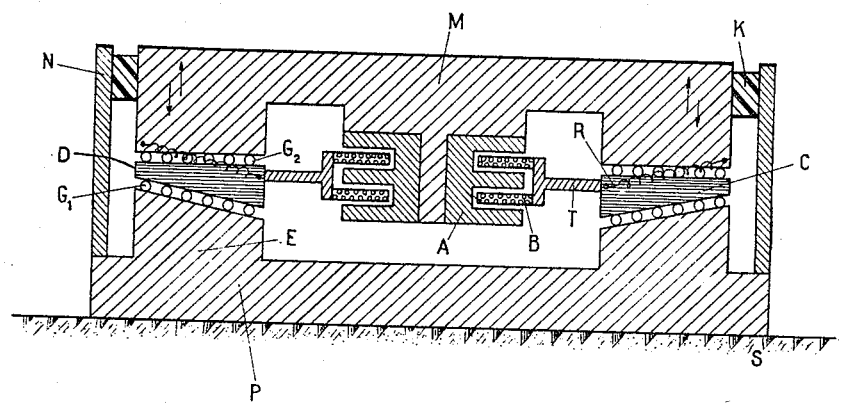
Fig: 1
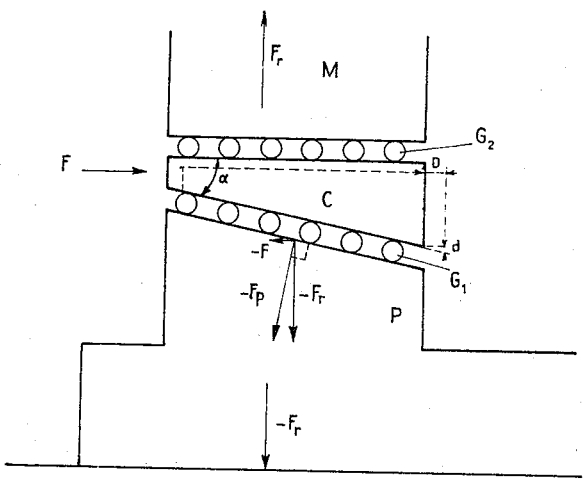
Fig. 2
INVENTORS
JACQUES CHOLET
GÉRARD GRAU
MICHEL LAVERGNE
BY Krafft & Wells
ATTORNEYS Nov. 22, 1966  J. CHOLET ET AL  3,287,696
VIBRATOR Filed Oct. 28, 1963  3 Sheets-Sheet 3

INVENTORS
JACQUES CHOLET
GÉRARD GRAU
MICHEL LAVERGNE

BY Krafft & Wells
ATTORNEYS

United States Patent Office 3,287,696
Patented Nov. 22, 1966

3,287,696
VIBRATOR
Jacques Cholet, Rueil-Malmaison, Gérard Grau, Paris, and Michel Lavergne, Le Vesinet, France, assignors to Institut Francais du Petrole, des Carburants et Lubrifiants, and Compagnie Generale de Geophysique, Rueil-Malmaison, Seine et Oise, France and Paris, France, respectively
Filed Oct. 28, 1963, Ser. No. 319,385
Claims priority, application France, Nov. 3, 1962, PV 914,306
13 Claims. (Cl. 340—17)

The present invention relates to a vibrator and particularly to a vibrator adapted for use in seismic prospecting.

The vibrators presently used in this field are essentially constituted of a vibration generator having a "moveable part" resting on the ground through the intermediary of a pulsing plate associated thereto and used for transmitting the vibrations to the earth.

The so-called "stationary part" of such a vibration generator takes its bearing on a mass. However, due to the high mechanical resistance of the soils and the characteristics of the conventional vibrators, the displacement of the pulsing plate and accordingly of the moveable part of the generator with respect to the stationary part thereof is generally of low amplitude and consequently of low efficiency since displacements of greater amplitude of the moveable part would lead to a better utilization of the maximal power available from the generator.

It is therefore an object of this invention to provide a generator of great efficiency.

It is another object of this invention to provide for the optimal use of the maximal power available from a vibration generator.

These and other objects as may be apparent from the following specification and claims are achieved by the vibrator according to this invention providing a mechanical transformer intermediate the moveable part of the generator and the pulsing plate whereby large displacements of the moveable part of the generator correspond to the small displacements of the pulsing plate.

Inasmuch as the conversion is effected without substantial loss of energy, the product of the force by the displacement is substantially the same on both sides of the mechanical transformer, so that to a small force applied to the moveable part of the generator, there may correspond a large force applied to the pulsing plate of the vibrator. The energizing force on the pulsing plate is accordingly multiplied substantially by the conversion factor.

The vibrators according to the invention are therefore characterized by a device for converting forces and displacements, achieving the above-mentioned results.

According to an essential feature of this invention, each vibrator comprises at least two vibration generators located therein with their moveable parts displaceable along such directions that the resultant of the horizontal components of the reaction forces generated thereby on the stationary part of the two generators is nullified.

According to another essential feature of this invention, each generator is integral with a wedge-shaped member (hereunder referred to as "wedge"), taking its bearing by its lower face on the horizontal pulsing plate forming the base of the apparatus.

The stationary part of each vibration generator may be rigidly locked either to the pulsing plate or to an upper plate of heavy mass. This latter rests on the upper faces of the wedges which are each connected to a corresponding moveable part of the generators.

The wedges, when actuated by the displacements of the moveable part of each vibration generator are sliding by means of slipping or rolling means between the pulsing plate and the upper plate of the vibrator.

These wedges, due to their shape and the angle formed between their upper and lower faces, which angle must be lower than $\pi/4$, have the effect of imparting a displacement to the pulsing plate with respect to the upper plate which is smaller than the corresponding displacement of the movable parts of the vibration generators with respect to the stationary parts thereof.

Accordingly, the force applied to the ground through the intermediary of the pulsing plate is higher than that which would have been applied if the vibration generators had been directly interposed between the pulsing plate and the upper plate of heavy mass.

The invention will be further described in more detail with reference to the accompanying drawings forming part of this specification and illustrating by way of example various embodiments of the invention.

In these drawings,

FIGURE 1 represents a cross-section of a first embodiment of vibrator according to the invention, provided with electro-magnetic generators.

FIGURE 2 is an enlarged view schematically illustrating the action of the wedges and the relationship between the force exerted thereon and the resulting force on the pulsing plate.

Figure 3:
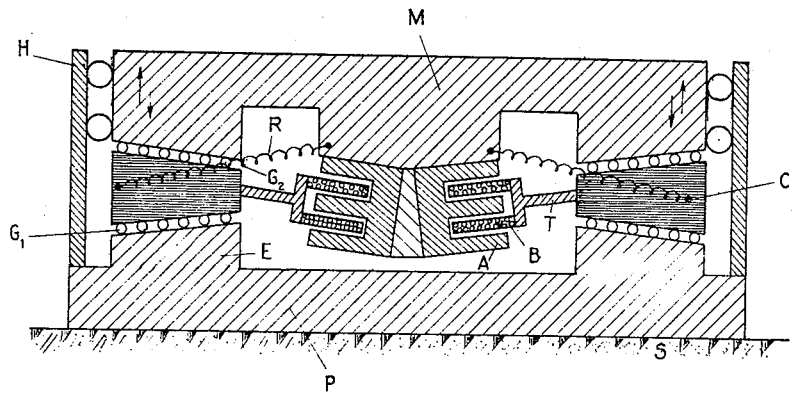
FIGURE 3 illustrates a second embodiment of vibrator whose generators have their moveable parts displaceable along a direction inclined with respect to the horizontal.

The operation of the vibrator will be described hereinafter with particular reference to FIGURES 1 and 2.

Each electro-magnetic generator comprises an annular moveable coil B displaceable into the annular air gap of the magnetic body A (consisting of a permanent magnet of an electro-magnet).

Such a generator, which is of a conventional type is only schematically shown in the drawings.

Each moveable coil B is rigidly locked through a rod T to a metallic wedge C having an angle lower than $\pi/4$ formed between its upper and lower face.

The lower face of each wedge C rests, through the intermediary of sliding or rolling means G1, upon a leg piece E of the pulsing plate P forming the base of the apparatus. This pulsing plate is placed with its lower face horizontally bearing on the ground S. The upper face of the leg piece E, supporting the lower face of the wedge C has the same inclination as the latter with respect to a horizonal plane.

According to a preferred embodiment of this invention, the stationary part of each vibration generator, i.e. each magnetic body or magnet A is integral with a plate M consisting of a heavy mass. This mass M rests on the upper face of each wedge C through sliding or rolling means G2. The upper face of the wedge and the lower face of the plate M, bearing thereon, are both parallel and oriented along the direction of displacement of the coil B (horizontal direction in the case of FIGURE 1).

When the apparatus is in operation, the moveable coil B is given a substantially horizontal reciprocating motion into the annular air gap of the magnetic body A. This coil B actuates, through the intermediary of the rod T, the wedge C in a back and forth motion while rolling or sliding along the inclined plane formed by the upper face of the leg piece E of the plate P. This motion of the wedge results, in turn, in a vertical reciprocating motion of the plate M.

At rest, there must exist an equilibrium position between the pulsing plate P, the wedges C and the plate M, corresponding to a mean position of the moveable coil B with respect to the annular air-gap of the magnetic body A so as to obtain substantially symmetrical vibrations on both sides of this mean position. The weight of the plate M naturally tends to move the wedges apart from their neutral position. It is therefore necessary to equilibrate the force exerted by the mass on each wedge by a spring designed for exerting an equal restoring force thereon. This spring R connects for instance the wedge C to the stationary part of the generator or to the pulsing plate or to the plate M, either directly or through intermediate pieces integral therewith.

On the accompanying drawings these springs are exerting a traction force on the wedges; however, there may also be used springs having a repelling action on the wedges to restore the equilibrium position thereof. For instance plate springs may be provided between the external face of the wedges and the internal wall of a stop member therefor, such as for instance the vertical slides H shown in FIGURE 4 or the carriers N of resilient stop members K shown in FIGURE 1.

It would be also possible to make use of a spring with a vertical axis, exerting a compressing force upwardly on the upper plate so that, at the equilibrium position, the plate M rests without exerting any force on the sliding or rolling means G1 and G2.

In both cases the spring must be so designed that the resonance frequency of the assembly which it forms with the plate M be lower than the useful vibration frequencies of the apparatus, the said resonance frequency being for instance of the order of 5 hertz.

The resilient stop means K or the vertical slides H, solid with the leg pieces E of the base, provide for an accurate guiding of the motion of the plate M in a vertical direction.

If $\alpha$ is the angle, lower than $\pi/4$, formed between the upper and the lower face of the wedge C and D, is a given horizontal displacement of the coil B with respect to the stationary part A of the generator and $d$ the corresponding vertical displacement of the plate M, it clearly appears on the drawing of FIGURE 2 that the following equation is attained:

$$d = D\, tg\, \alpha$$

The reduction in amplitude of the movements to be applied to the ground is thus easily achieved by the device according to the invention.

As it is apparent on FIGURE 2, showing the various forces exerted in the system, to a force F applied by the generator to the wedge C there corresponds a force $-Fp$ applied by the wedge C to the pulsing plate P, the magnitude of which is such that its projection along a direction parallel to that of F is equal to $-F$.

Consequently, the vertical component $-Fr$ of the force $-Fp$ applied to the ground and to the plate M is equal to $F/\tan \alpha$.

This calculation, which is a simplified approach inasmuch as the inertia force due to the mass of the wedge C has been neglected, clearly shows the multiplying effect on the forces exerted by the wedge C on the sliding or rolling means G1 and G2, provided that the angle $\alpha$ is lower than $\pi/4$.

Since the energy absorbed for moving the wedge is not effective for imparting a force to the ground, it is convenient to make use of wedges of the lowest possible mass.

In order to have the action of the plate P on the ground limited to a vertical force $-Fr$, the horizontal component $-F$ of the force $-Fp$ applied by the wedge C to the plate P must be neutralized. This is achieved by the above described arrangement illustrated by way of example in FIGURE 1, where two generators are so associated together that they vibrate simultaneously in opposite directions and have their moveable parts in one line with each other.

The horizontal components of forces Fp thereby cancel each other and the pulsing plate vertically imparts to the ground a force equal to $-2Fr$.

Due to the device of this invention, it is thus possible to reduce the amplitudes and accordingly the speed of displacement of the pulsing plate as compared to the speed which would have been that of the same pulsing plate if the latter were directly connected to the moveable part, then vertically oriented, of the generator (which is usually used in vibrators of this type). Said speed reduction is accompanied with an increase in inverse ratio of the force imparted to the ground.

The above described embodiment of the invention as illustrated by FIGURE 1 is not intended to be in any way limitative of the scope of the invention.

By way of example further embodiments are illustrated in FIGURES 3 to 6.

According to the embodiment shown in FIGURE 3, the upper face G2 of the wedge C has an inclination different from the horizontal. This is possible since the only condition to be fulfilled is that one of the two faces of the wedge must have an orientation parallel to that of the displacement of the moveable coil B with respect to the magnetic body A, the position of A and B being adapted so as to comply with this requirement.

Figure 4:
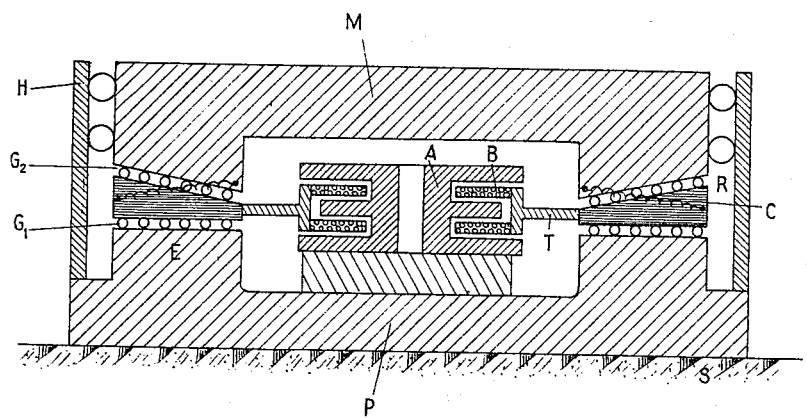
FIGURE 4 shows a third embodiment of vibrator wherein the common stationary part of the generators is solid with the pulsing plate.
Figure 5:
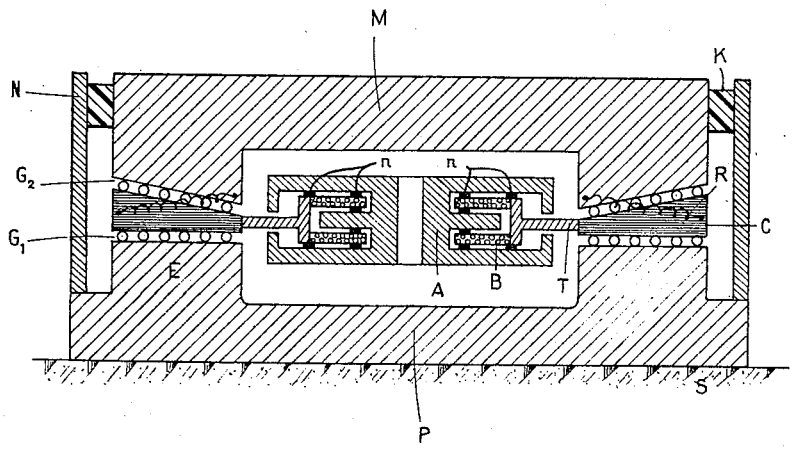
FIGURE 5 illustrates another embodiment of vibrator wherein the common stationary part of the generators is supported by the corresponding movable parts in engagement therewith, and, FIGURE 6 shows a cross section of a pair of associated hydraulic generators which may be used in a vibrator according to this invention.
Figure 6:
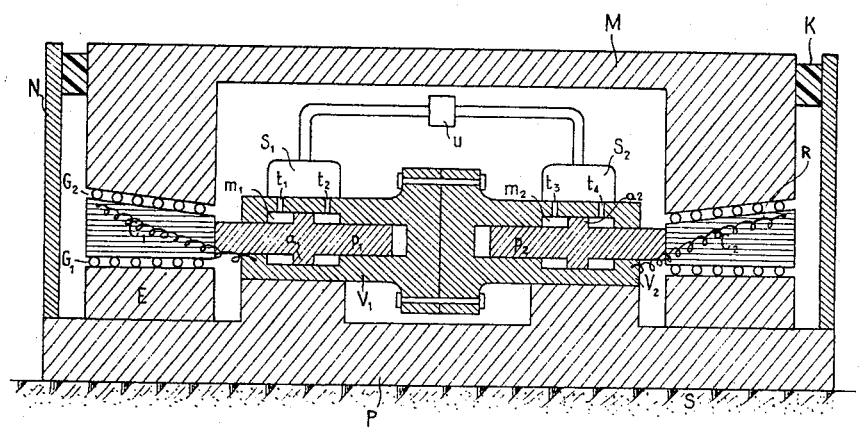

It is also possible, as illustrated by the embodiment shown in FIGURES 4 and 5 to have the magnetic body A non-solid, with the plate M, i.e. either integral with the pulsing plate as shown in FIGURE 6, or supported by the moveable parts engaged thereinto as illustrated in FIGURE 5. In this latter case, centering rings $n$ must be placed in the air-gap between the coil B and the corresponding cavity of the magnetic body A wherein it is engaged.

However, it is preferred to have the magnetic body A integral with the upper plate M since the mass of A is then added to the mass of the plate M and contributes to provide the required inertia force.

The above-described embodiments as illustrated by FIGURES 1 and 3–5 are only given by way of example and are not to be considered as limitative of the scope of the invention. It is clear that there may be used more than two vibration generators in the same vibrator and, for instance, any number of pairs of generators with the two generators of each pair disposed in the above-described manner with respect to each other, or any number of generators higher than two, the generators being so disposed that the resultant of the horizontal components of the forces exerted by all the generators be nullified (for instance, three generators having their moveable parts along respective directions at 120° from each other or five generators whose moveable parts are spaced at 72° from each other).

The device, according to this invention, is applicable not only to vibrators of the electro-magnetic type but also to other types of vibrators such as pneumatic, hydraulic or mechanical vibrators, the device of this invention being adaptable to such types of vibrators similarly as in the case of electro-magnetic vibrators.

A pair of hydraulic generators adapted for use in vibrators according to this invention are illustrated by way of example in FIGURE 6. The two generators V1 and V2 of said pair are placed in opposite directions: Each of them comprises a piston ($p1$ and $p2$, respectively) provided with an annular protrusion ($a1$, $a2$) slidable with a slight clearance in a cylindrical cavity ($m1$, $m2$) communicating through two ports ($t1$ and $t2$ or $t3$ and $t4$) with a servo-distributor (S1 or S2) of fluid under pressure, the two servo-distributors being fed, through a common pipe U. In this arrangement, the force exerted on the wedge C1 and C2 is controlled by the pressure difference to which are subjected the pistons of the generators, controlled in turn by the servo-distributors.

From the foregoing description, one skilled in the art can easily ascertain the essential characteristics of this invention and, without departing from the spirit and scope thereof, can make various changes and modifications of the invention to adapt it to various usages and conditions. Consequently, such changes and modifications are properly, equitably and intended to be within the full range of equivalence of the following claims.

What is claimed as this invention is:

1. A vibrator comprising a pulsing plate, an upper plate of heavy mass, vertically moveable, taking its bearing on a plurality of wedge-shaped members whose upper and lower faces have an angle of less than $\pi/4$ formed therebetween, said wedge-shaped members being supported by the pulsing plate and having their upper and lower faces parallel, respectively, to the corresponding faces of the two plates, a plurality of vibration generators of reciprocating motion, each comprising a moveable part integral with a separate one of the wedge-shaped members, said moveable parts having a displacement in synchronism with respect to a stationary part common to all of said vibration generators, said moveable parts spaced from each other at regularly distributed angular intervals around an axis perpendicular to said pulsing plate, said displacement directed to a common point on said axis and said moveable parts having the same inclination with respect to said axis.

2. A vibrator comprising a pulsing plate, an upper plate of heavy mass, vertically moveable, taking its bearing on a plurality of wedge-shaped members whose upper and lower faces have an angle of less than $\pi/4$ formed therebetween, said wedge-shaped members being supported by the pulsing plate and having their upper and lower faces parallel, respectively, to the corresponding faces of the two plates, a plurality of vibration generators of reciprocating motion, each comprising a moveable part integral with a separate one of the wedge-shaped members, said moveable parts being displaceable with respect to a stationary part common to all of the vibration generators, along a direction parallel to the face of that one of the two plates to which is rigidly locked said stationary part, said vibration generators being adapted for operation in synchronism and placed respectively as regularly distributed angular intervals around an axis perpendicular to said pulsing plate.

3. A vibrator according to claim 1 comprising sliding means between the upper and lower faces of the wedge-shaped members, and other sliding means between the corresponding faces of the two plates.

4. A vibrator according to claim 1 comprising rolling means between the upper and lower faces of the wedge-shaped members, and other sliding means between the corresponding faces of the two plates.

5. A vibrator according to claim 1 wherein the common stationary part of the vibration generators is fixed to the upper plate.

6. A vibrator according to claim 1 wherein the common stationary part of the vibration generators is fixed to the pulsing plate.

7. A vibrator according to claim 1 wherein the common stationary part of the vibration generators is supported by the moveable parts in engagement therewith.

8. A vibrator according to claim 1 wherein each wedge-shaped member is subjected to a permanent force substantially balancing the effect of the weight of the upper plate therein, said force being produced by resilient means.

9. A vibrator according to claim 8 wherein said resilient means consist of a spring exerting a traction force on the wedge-shaped member.

10. A vibrator according to claim 8 wherein said resilient means consist of a plate spring exerting a restoring repelling force on the wedge-shaped member.

11. A vibrator according to claim 8 wherein said resilient means are interposed between a wedge-shaped member and the pulsing plate.

12. A vibrator according to claim 8 wherein said resilient means are interposed between a wedge-shaped member and the upper plate.

13. A vibrator according to claim 8 wherein said resilient means are interposed between a wedge-shaped member and the common stationary part of said vibration generators.

References Cited by the Examiner
UNITED STATES PATENTS

| 2,422,707 | 6/1947 | Turner | 340—8 |
| 2,962,695 | 11/1960 | Harris | 340—10 |

FOREIGN PATENTS 818,868 10/1951 Germany.

BENJAMIN A. BORCHELT, *Primary Examiner.*

P. A. SHANLEY, *Assistant Examiner.*